(12) United States Patent
Ohmi

(10) Patent No.: US 8,411,699 B2
(45) Date of Patent: Apr. 2, 2013

(54) COMMUNICATION METHOD, COMMUNICATION APPARATUS, AND COMMUNICATION SYSTEM

(75) Inventor: Shinichiro Ohmi, Osaka (JP)

(73) Assignee: Panasonic Corporation, Osaka (JP)

( * ) Notice: Subject to any disclaimer, the term of this patent is extended or adjusted under 35 U.S.C. 154(b) by 422 days.

(21) Appl. No.: 12/643,672

(22) Filed: Dec. 21, 2009

(65) Prior Publication Data
US 2010/0158038 A1 Jun. 24, 2010

(30) Foreign Application Priority Data

Dec. 19, 2008 (JP) ................................ 2008-324613

(51) Int. Cl.
*H04L 12/413* (2006.01)
(52) U.S. Cl. ........ 370/445; 370/462; 370/458; 370/449; 370/443
(58) Field of Classification Search .................. 370/443, 370/445, 462, 449, 458
See application file for complete search history.

(56) References Cited

U.S. PATENT DOCUMENTS

| | | | |
|---|---|---|---|
| 6,914,895 B1 | 7/2005 | Straub | |
| 7,729,375 B2 * | 6/2010 | Miyazaki et al. | 370/466 |
| 7,830,907 B1 * | 11/2010 | Petranovich et al. | 370/436 |
| 8,238,376 B2 | 8/2012 | Iwamura | |
| 2004/0252648 A1 | 12/2004 | Ojard | |
| 2006/0072695 A1 * | 4/2006 | Iwamura | 375/354 |
| 2006/0233203 A1 | 10/2006 | Iwamura | |

FOREIGN PATENT DOCUMENTS

| | | |
|---|---|---|
| EP | 1 179 919 | 2/2002 |
| JP | 2006246035 | 9/2006 |
| JP | 2007-166104 | 6/2007 |
| JP | 2008-537409 | 9/2008 |

OTHER PUBLICATIONS

International Search Report dated Apr. 9, 2010.

\* cited by examiner

*Primary Examiner* — Huy D Vu
*Assistant Examiner* — Omer Mian
(74) *Attorney, Agent, or Firm* — Dickinson Wright PLLC

(57) ABSTRACT

A communication apparatus communicates with another communication apparatus connected to a transmission channel and sharing a communication band. The communication apparatus includes: a receiving unit that receives, through the transmission channel, data including time information based on a transmission time when a synchronous signal is transmitted to the transmission channel from a synchronous signal transmitting apparatus at a given cycle, the synchronous signal for synchronizing a plurality of communication apparatuses; a transmitting unit that transmits data to the transmission channel; and a transmission control unit that estimates a synchronous signal non-existing period in which there is no synchronous signal on the transmission channel on the basis of the time information received by the receiving unit and the given cycle, and controls the transmitting unit to transmit data within the estimated synchronous signal non-existing period.

9 Claims, 11 Drawing Sheets

FIG.6

| SLAVE MANAGEMENT NUMBER (MAC ADDRESS) | ACCESS ID |
|---|---|
| O (00:80:F0:5F:00:00) | 1 |
| B1 (00:80:F0:5F:00:01) | 3 |
| B2 (00:80:F0:5F:00:02) | 2 |
| B3 (00:80:F0:5F:00:03) | 4 |
| B4 (00:80:F0:5F:00:04) | — |
| B5 (00:80:F0:5F:00:05) | — |
| B6 (00:80:F0:5F:00:06) | — |
| B7 (00:80:F0:5F:00:07) | — |
| B8 (00:80:F0:5F:00:08) | — |
| B9 (00:80:F0:5F:00:09) | — |

FIG.7

| SUB-SLAVE MANAGEMENT NUMBER (MAC ADDRESS) |
|---|
| C1 (00:80:F0:5F:10:01) |
| C2 (00:80:F0:5F:10:02) |
| C3 (00:80:F0:5F:10:03) |
| C4 (00:80:F0:5F:10:04) |
| C5 (00:80:F0:5F:10:05) |
| C6 (00:80:F0:5F:10:06) |
| C7 (00:80:F0:5F:10:07) |
| C8 (00:80:F0:5F:10:08) |
| C9 (00:80:F0:5F:10:09) |

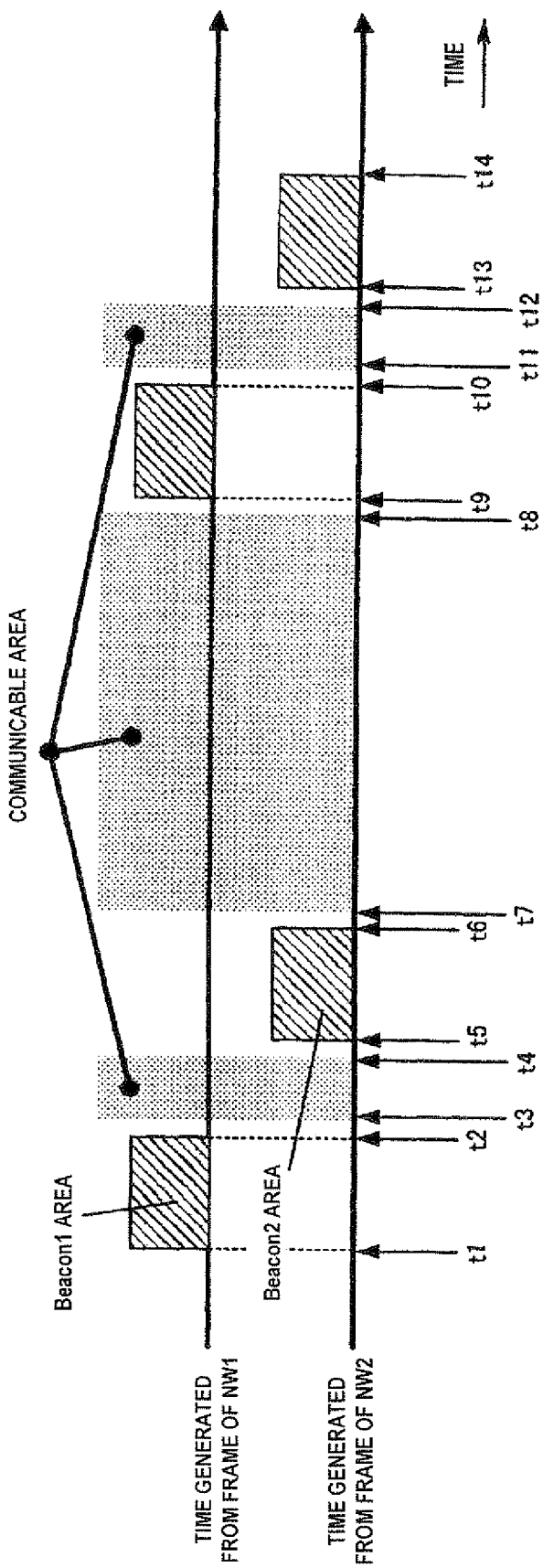

COMMUNICATION METHOD, COMMUNICATION APPARATUS, AND COMMUNICATION SYSTEM

BACKGROUND

1. Technical Field

The present invention relates to a communication method, a communication apparatus, and a communication system for communication among a plurality of communication apparatuses using a common transmission channel by sharing a communication band.

2. Background Art

In communication systems using power line communications (PLC) or wireless LAN (Local Area Network), a plurality of communication apparatuses communicate with one another using a common transmission channel by sharing a communication band. Accordingly, when the plurality of communication apparatuses simultaneously transmits signals to the transmission channel, interference occurs and thus it is difficult to perform communication. Therefore, it is necessary to avoid such collision of access from the plurality of communication apparatuses to the transmission channel.

As one of methods for avoiding such collision of access, CSMA/CA (Carrier Sense Multiple Access with Collision Avoidance) has been known. In the CSMA/CA, each communication apparatus recognizes the usage of a transmission channel, and transmits a signal during a period in which other communication apparatuses are not using the transmission channel. Specifically, the communication apparatus detects whether or not there is a carrier (carrier signal) of the signal transmitted by the other communication apparatus. When the communication apparatus detects the carrier, the communication apparatus waits until the communication performed by the other communication apparatus is completed. Meanwhile, if the communication apparatus does not detect the carrier, the communication apparatus tries to transmit a signal after additionally waiting for a waiting time called a back-off time. By determining the back-off time on the basis of a random value or the like, even when a plurality of communication apparatuses share the same transmission channel, it is possible to reduce the occurrence frequency of collisions and further to raise the use efficiency of the transmission channel.

As a known technique related to the communication using the CSMA/CA, it has been known to perform multiplexing of frames to improve transmission efficiency of the frames (e.g., see JP-A-2006-246035). In addition, a technique for allowing CSMA and TDMA (Time Division Multiple Access) to coexist on the same transmission channel has been known (e.g., see JP-A-2007-166104).

A communication network connected to a power line communication apparatus performing the known power line communication includes one or more power line communication apparatuses as slaves, and power line communication apparatuses as masters for managing them. There is an upper limit in the total number of the power line communication apparatuses as masters and the power line communication apparatuses as slaves which are connectable to one communication network or a common transmission channel, for example, it is limited to 255. In addition, it is important to allow relatively low speed power line communication apparatuses, which do not need high speed control data and commands, to coexist with known high speed power line communication apparatuses without having an influence on the performance of the high speed power line communication apparatuses.

However, according to used applications, there is a case where a desired process cannot be performed in the range of the limited number of the power line communication apparatuses in such one communication network.

For example, the known power line communication apparatus as master or slaves needs to detect beacon signals periodically transmitted from the power line communication apparatuses as the masters, or each slave needs to correctly recognize a time slot assigned to itself. Accordingly, a microcomputer with high process throughput or a high-performance logic circuit is necessary to perform communication control. Such a microcomputer with high process performance or the like is expensive.

If it is necessary to additionally install more power line communication apparatuses, it is preferable that the power line communication apparatus can be additionally installed as inexpensively as possible. In this case, signal collision with signals transmitted by the other power line communication apparatuses has to be necessarily avoided in the same manner as the known power line communication apparatuses as master or slaves.

SUMMARY

An object of the invention is to inexpensively provide a communication method, a communication apparatus, and a communication system capable of avoiding signal collision with signals transmitted from another communication apparatus.

According to an aspect of the invention, there is provided a communication apparatus communicating with another communication apparatus connected to a transmission channel and sharing a communication band, the communication apparatus including: a receiving unit that receives, through the transmission channel, data including time information based on a transmission time when a synchronous signal is transmitted to the transmission channel from a synchronous signal transmitting apparatus at a given cycle, the synchronous signal for synchronizing a plurality of communication apparatuses; a transmitting unit that transmits data to the transmission channel; and a transmission control unit that estimates a synchronous signal non-existing period in which there is no synchronous signal on the transmission channel on the basis of the time information received by the receiving unit and the given cycle, and controls the transmitting unit to transmit data within the estimated synchronous signal non-existing period.

According to the communication apparatus, a period in which a synchronous signal such as a beacon signal appears on the transmission channel is estimated and it is possible to transmit data at a time except for this period. That is, even in a case of a communication apparatus which cannot recognize a synchronous signal, it is possible to avoid collision with the synchronous signal to perform communication. Accordingly, it is possible to inexpensively realize a communication apparatus capable of avoiding signal collision with signals transmitted by the other communication apparatuses.

According to another aspect of the invention, there is provided a communication system provided with a plurality of communication apparatuses connected to a transmission channel and sharing a communication band, the communication system including: a first communication apparatus that transmits a synchronous signal for synchronizing the plurality of communication apparatuses to the transmission channel at a given cycle; a second communication apparatus that transmits data including time information based on a transmission time if the synchronous signal is transmitted to the transmission channel by the first communication apparatus; and a third communication apparatus that receives the data received from the second communication apparatus as reception data, and transmits transmission data to the transmission channel, wherein the third communication apparatus estimates a synchronous signal non-existing period in which there is no synchronous signal on the transmission channel on the basis of the time information included in the reception data and the given cycle at which the synchronous signal is transmitted, and controls the transmission data to be transmitted within the estimated synchronous signal non-exiting period.

According to the communication system, the period in which the synchronous signal such as a beacon signal appears on the transmission channel is estimated, and thus it is possible to transmit data at a time except for the period. That is, even in a case of a communication apparatus which cannot recognize a synchronous signal, it is possible to perform communication while avoiding collision with synchronous signals. Accordingly, it is possible to inexpensively realize a communication apparatus capable of avoiding the signal collision with signals transmitted by the other communication apparatuses.

According to still another aspect of the invention, there is provided a communication method of communicating among a plurality of communication apparatuses connected to a transmission channel and sharing a communication band, the communication method including: a reception step of receiving, through the transmission channel, reception data including time information based on a transmission time when a synchronous signal is transmitted to the transmission channel from the synchronous signal transmitting apparatus at a given cycle, the synchronous signal for synchronizing the plurality of communication apparatuses; a transmission control step of estimating a synchronous signal non-existing period in which there is no synchronous signal on the transmission channel on the basis of the time information included in the reception data and the given cycle, and controlling transmission data to be transmitted within the estimated synchronous signal non-existing period; and a transmission step of transmitting the transmission data to the transmission channel.

According to the communication method, the period in which the synchronous signal such as a beacon signal appears on the transmission channel is estimated, and thus it is possible to transmit data at the time except for the period. That is, even in a case of a communication apparatus which cannot recognize a synchronous signal, it is possible to perform communication while avoiding collision with synchronous signals. Accordingly, it is possible to inexpensively realize a communication apparatus capable of avoiding the signal collision with signals transmitted by the other communication apparatuses.

BRIEF DESCRIPTION OF THE DRAWINGS

In the accompanying drawings:

FIG. 6 is a diagram illustrating an example of a slave management table provided in a PLC modem (master) according to the embodiment of the invention;

FIG. 7 is a diagram illustrating an example of a sub-slave management table provided in a PLC modem (slave) according to the embodiment of the invention;

FIG. 13 is a time-series diagram illustrating an example of data transmitted to a power line according to the embodiment of the invention.

DETAILED DESCRIPTION

Figure 1:
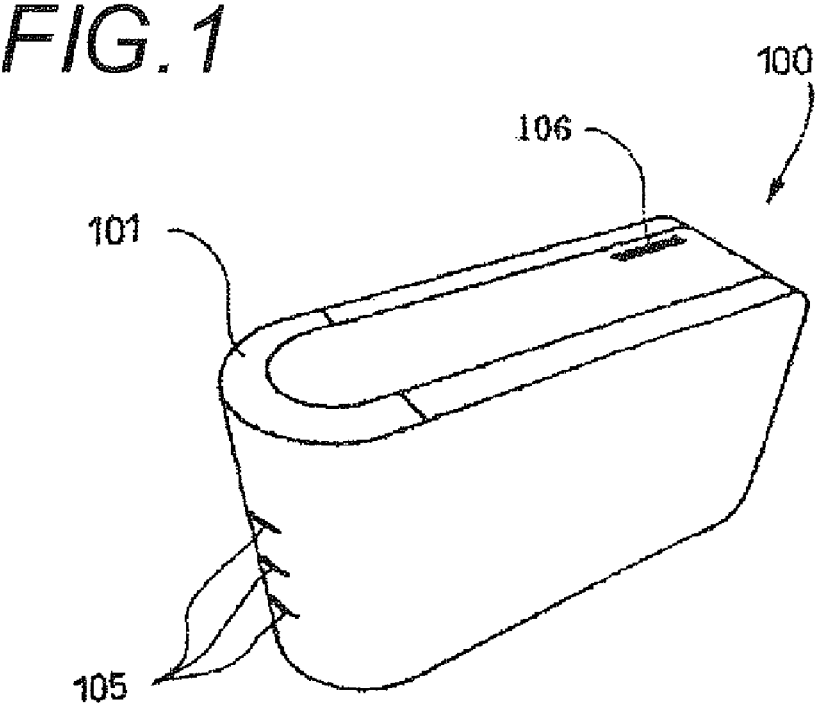
FIG. 1 is an external perspective view illustrating a front of a PLC modem according to an embodiment of the invention.

According to an aspect of the invention, there is provided a communication apparatus communicating with another communication apparatus connected to a transmission channel and sharing a communication band, the communication apparatus including: a receiving unit that receives, through the transmission channel, data including time information based on a transmission time when a synchronous signal is transmitted to the transmission channel from a synchronous signal transmitting apparatus at a given cycle, the synchronous signal for synchronizing a plurality of communication apparatuses; a transmitting unit that transmits data to the transmission channel; and a transmission control unit that estimates a synchronous signal non-existing period in which there is no synchronous signal on the transmission channel on the basis of the time information received by the receiving unit and the given cycle, and controls the transmitting unit to transmit data within the estimated synchronous signal non-existing period.

According to the communication apparatus, a period in which a synchronous signal such as a beacon signal appears on the transmission channel is estimated and it is possible to transmit data at a time except for this period. That is, even in a case of a communication apparatus which cannot recognize a synchronous signal, it is possible to avoid collision with the synchronous signal to perform communication. Accordingly, it is possible to inexpensively realize a communication apparatus capable of avoiding signal collision with signals transmitted by the other communication apparatuses.

In the communication apparatus, the transmission control unit may estimate the synchronous signal non-existing period on the basis of a duration when the synchronous signal is transmitted, and controls the transmitting unit to transmit data within the estimated synchronous signal non-existing period.

According to the communication apparatus, the synchronous signal non-existing period on the transmission channel is estimated on the basis of the time, period, and duration when the synchronous signal is transmitted, and thus it is possible to further correctly synchronize even when the ability of recognizing a synchronous signal is low.

In the communication apparatus, the receiving unit may receive, through the transmission channel, first data including first time information based on a first transmission time when a first synchronous signal is transmitted to the transmission channel from a first synchronous signal transmitting apparatus at a first given cycle, the communication apparatus and the first synchronous signal transmitting apparatus included in a first network, and receive second data including second time information based on a second transmission time when a second synchronous signal is transmitted to the transmission channel from a second synchronous signal transmitting apparatus at a second given cycle, the second synchronous signal transmitting apparatus and another communication apparatus except for the communication apparatus included a second network, and the transmission control unit may estimate a synchronous signal non-existing period in which there are no first synchronous signal and no second synchronous signal on the transmission channel on the basis of the first time information, the second time information, the first given cycle, and the second given cycle, which are received by the receiving unit, and controls the transmitting unit to transmit data within the estimated synchronous signal non-existing period.

According to the communication apparatus, even in a communication system in which there is a plurality of networks with different synchronous signals, it is possible to perform communication without collision with the synchronous signals used in the networks.

In the communication apparatus, the transmission control unit may estimate the synchronous signal non-existing period on the basis of a first duration when the first synchronous signal is transmitted and a second duration when the second synchronous signal is transmitted, and controls the transmitting unit to transmit data within the estimated synchronous signal non-existing period.

According to the communication apparatus, even in a communication system in which there is a plurality of networks with different synchronous signals, the synchronous signal non-existing period on the transmission channel is estimated on the basis of the time, period, and duration when the synchronous signal is transmitted, and thus it is possible to further correctly synchronize even without ability of recognizing a synchronous signal.

The communication apparatus may further include a storage unit that previously stores information of the given cycle and information of the duration.

In the communication apparatus, the receiving unit may receive data including information of the given cycle and information of the duration in addition to the time information.

According to the communication apparatus, even in an inexpensive communication apparatus which cannot recognize a synchronous signal, it is possible to know the information of a regular period and a duration of the synchronous signal, and thus it is possible to avoid collision with the synchronous signal at the time of transmitting data.

In the communication apparatus, the transmission control unit may insert information of transmission time of data to be transmitted by the transmitting unit into the data to be transmitted, on the basis of the first time information received by the receiving unit.

According to the communication apparatus, even when a communication apparatus that is a communication target cannot recognize a synchronous signal, it is possible to transmit the present time based on the synchronous signal as standard. In addition, when communication is performed among the networks with different synchronous signals and the communication apparatus is operated as a relay device, it is possible to transmit synchronous information of the network in which the communication apparatus is included, to the communication apparatus as the relay device of the other network. Accordingly, even when a plurality of networks is in an asynchronous state, it is possible to perform communication among the networks while avoiding transmission time of the synchronous signals of the networks by the notification of the synchronous information.

In the communication apparatus, power line may be used as the transmission channel to perform power line communication.

According to the communication apparatus, even when the power line communication is performed, it is possible to inexpensively avoid signal collision with signals transmitted by the other communication apparatuses. Particularly, it is possible to avoid the collision with synchronous signals including important information, and thus it is possible to realize smooth communication.

The communication apparatus may further include a timer for counting a time elapsed from a time point, wherein the timer is updated in accordance with the received time information.

In the communication apparatus, wherein the time information may indicate a time elapsed from a reception time of the synchronous signal to a transmission time of the data.

According to another aspect of the invention, there is provided a communication system provided with a plurality of communication apparatuses connected to a transmission channel and sharing a communication band, the communication system including: a first communication apparatus that transmits a synchronous signal for synchronizing the plurality of communication apparatuses to the transmission channel at a given cycle; a second communication apparatus that transmits data including time information based on a transmission time if the synchronous signal is transmitted to the transmission channel by the first communication apparatus; and a third communication apparatus that receives the data received from the second communication apparatus as reception data, and transmits transmission data to the transmission channel, wherein the third communication apparatus estimates a synchronous signal non-existing period in which there is no synchronous signal on the transmission channel on the basis of the time information included in the reception data and the given cycle at which the synchronous signal is transmitted, and controls the transmission data to be transmitted within the estimated synchronous signal non-exiting period.

According to the communication system, the period in which the synchronous signal such as a beacon signal appears on the transmission channel is estimated, and thus it is possible to transmit data at a time except for the period. That is, even in a case of a communication apparatus which cannot recognize a synchronous signal, it is possible to perform communication while avoiding collision with synchronous signals. Accordingly, it is possible to inexpensively realize a communication apparatus capable of avoiding the signal collision with signals transmitted by the other communication apparatuses.

In the communication system, power line may be used as the transmission channel to perform power line communication.

According to the communication system, even when the power line communication is performed, it is possible to inexpensively avoid signal collision with signals transmitted by the other communication apparatus. Particularly, it is possible to avoid the collision with synchronous signals including important information, and thus it is possible to realize smooth communication.

According to still another aspect of the invention, there is provided a communication method of communicating among a plurality of communication apparatuses connected to a transmission channel and sharing a communication band, the communication method including: a reception step of receiving, through the transmission channel, reception data including time information based on a transmission time when a synchronous signal is transmitted to the transmission channel from the synchronous signal transmitting apparatus at a given cycle, the synchronous signal for synchronizing the plurality of communication apparatuses; a transmission control step of estimating a synchronous signal non-existing period in which there is no synchronous signal on the transmission channel on the basis of the time information included in the reception data and the given cycle, and controlling transmission data to be transmitted within the estimated synchronous signal non-existing period; and a transmission step of transmitting the transmission data to the transmission channel.

According to the communication method, the period in which the synchronous signal such as a beacon signal appears on the transmission channel is estimated, and thus it is possible to transmit data at the time except for the period. That is, even in a case of a communication apparatus which cannot recognize a synchronous signal, it is possible to perform communication while avoiding collision with synchronous signals. Accordingly, it is possible to inexpensively realize a communication apparatus capable of avoiding the signal collision with signals transmitted by the other communication apparatuses.

In the communication method, a power line may be used as the transmission channel to perform power line communication.

According to the communication method, even when the power line communication is performed, it is possible to inexpensively avoid signal collision with signals transmitted by the other communication apparatus. Particularly, it is possible to avoid the collision with synchronous signals including important information, and thus it is possible to realize smooth communication.

Therefore, it is possible to inexpensively avoid signal collision with signals transmitted by the other communication apparatuses. For example, a communication apparatus as a sub-slave having no function of receiving a beacon signal and a communication apparatus as a slave having a function of receiving a beacon signal are connected to a common transmission channel to configure a communication system. Accordingly, it is possible to drastically reduce the cost of a communication apparatus as a sub-slave, and to prevent collision between a signal transmitted by the communication apparatus as the sub-slave and the beacon signal.

Embodiment

Hereinafter, a communication method, a communication apparatus, and a communication system according to an embodiment of the invention will be described with reference to the drawings.

Figure 2:
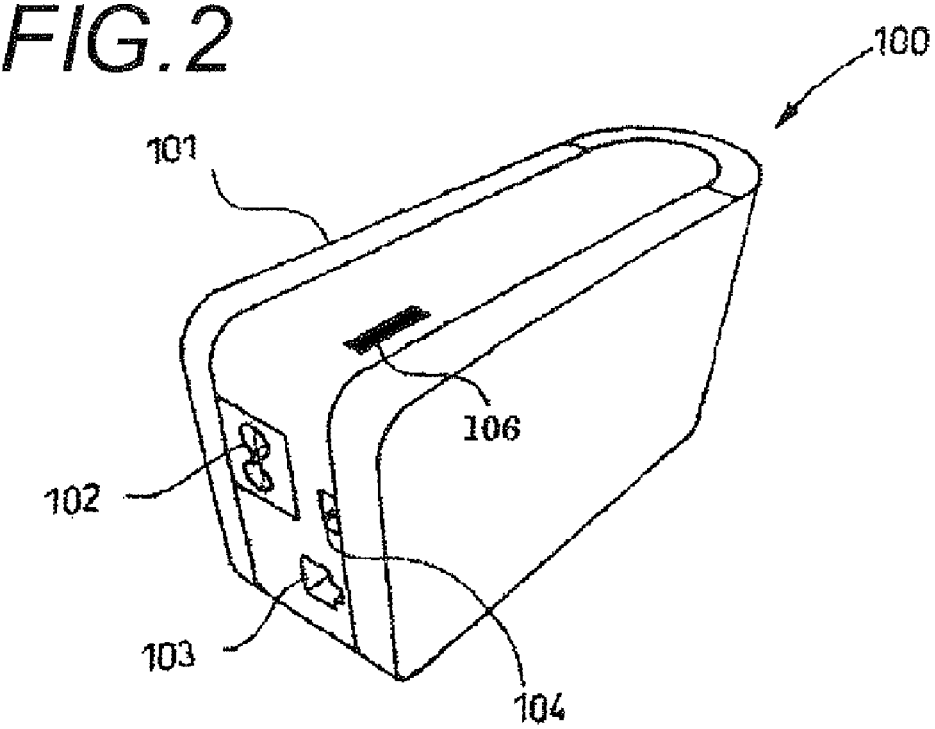
FIG. 2 is an external perspective view illustrating a rear of the PLC modem according to the embodiment of the invention.

FIG. 1 is an external perspective view illustrating a front of a PLC (Power Line Communication) modem 100 as an example of a power line communication apparatus, and FIG. 2 is an external perspective view illustrating a rear of the PLC modem 100. The PLC modem 100 shown in FIG. 1 and FIG. 2 has a casing 101, and a display unit 105 such as an LED (Light Emitting Diode) as shown in FIG. 1 is provided on a front of the casing 101.

As shown in FIG. 2, a power supply connector 102, a modular jack 103 for LAN (Local Area Network) such as RJ45, and a switch 104 for switching an operation mode are provided on a rear of the casing 101.

A button 106 is provided on a top of the casing 101. The button 106 has a function as a set-up button for starting a process (registration process) for the PLC modem 100 to be in a communicable state. The button 106 is provided on the top of the casing 101 as an example, but is not limited to the position.

The power supply connector 102 is connected to a power supply cable (not shown), and the modular jack 103 is connected to a LAN cable (not shown).

The PLC modem 100 may be further provided with a Dsub (D-subminiature) connector to connect a Dsub cable.

The PLC modem 100 is exemplified as an example of the power line communication apparatus, but an electric device provided with a PLC modem therein may be used as the power line communication apparatus. As the electric device, for example, there are home appliances such as televisions, telephones, video decoders, and set-top boxes, and office machines such as personal computers, facsimiles, and printers.

The PLC modem 100 is connected to a power line 700 to constitute a power line communication system together with the other PLC modem 100.

Figure 3:
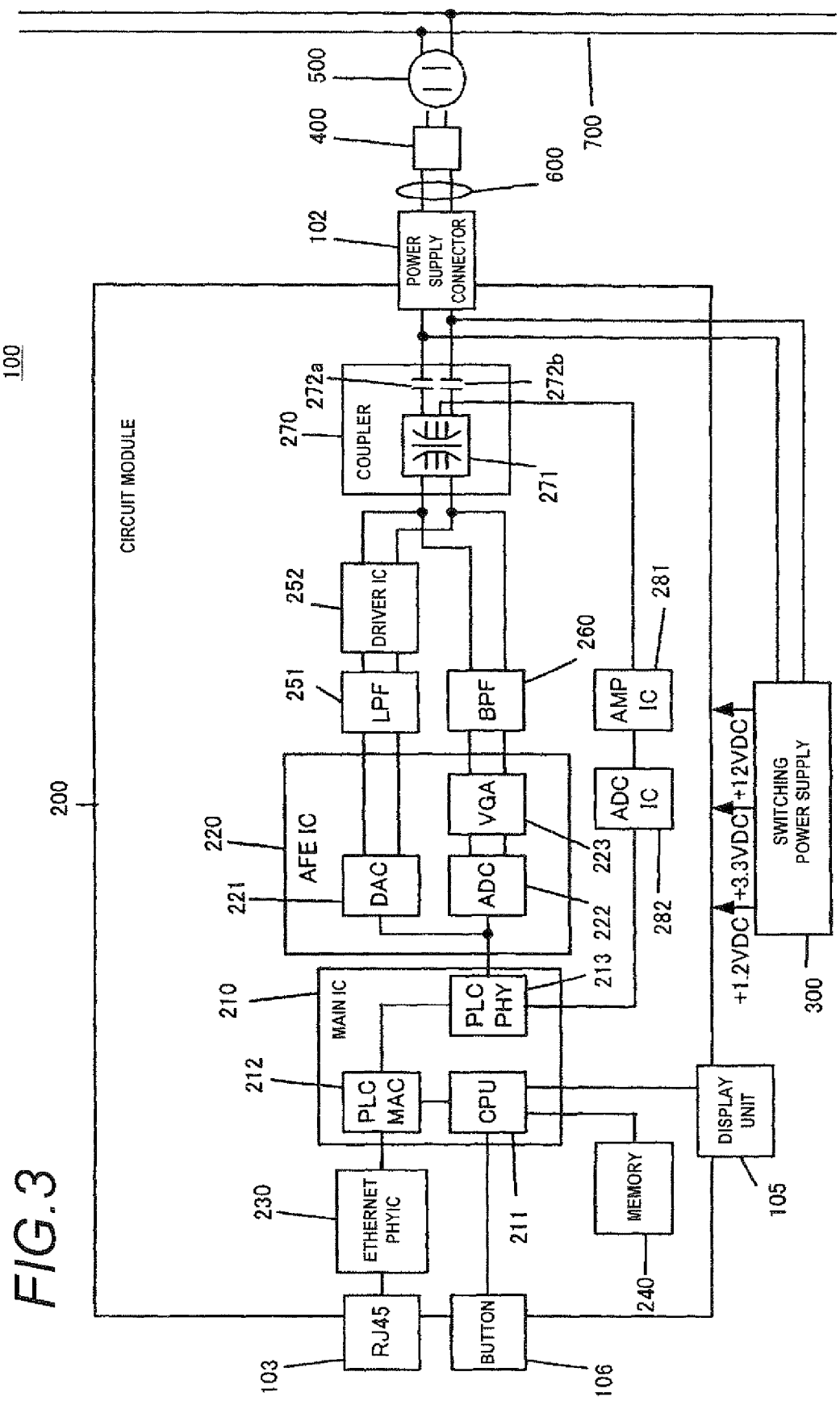
FIG. 3 is a diagram illustrating an example of hardware of the PLC modem according to the embodiment of the invention.

Next, FIG. 3 mainly shows an example of a hardware configuration of the PLC modem 100. The PLC modem 100 has a circuit module 200 and a switching power supply 300. The switching power supply 300 supplies various kinds (e.g., +1.2V, +3.3V, +12V) of voltage to the circuit module 200, for example, is configured by including a switching transformer and a DC-DC converter (all not shown).

The circuit module 200 is provided with a main IC (Integrated Circuit) 210, AFE•IC (Analog Front End•Integrated Circuit) 220, an Ethernet (registered trademark) PHY•IC (Physical layer Integrated Circuit) 230, a memory 240, a low pass filter (LPF) 251, a driver IC 252, a band pass filter (BPF) 260, a coupler 270, an AMP (amplifier) IC 281, and an ADC (AD conversion) IC 282. The switching power supply 300 and the coupler 270 are connected to the power supply connector 102, and are further connected to the power supply line 700 through a power supply cable 600, a power supply plug 400, and an outlet 500. In addition, the main IC 210 serves as a control circuit for performing power line communication.

The main IC 210 includes a CPU (Central Processing Unit) 211, a PLC MAC (Power Line Communication Media Access Control layer) block 212, and a PLC•PHY (Power Line Communication•Physical layer) block 213.

The CPU 211 is provided with a 32-bit RISC (Reduced Instruction Set Computer) processor therein. The PLC-MAC block 212 manages a MAC layer (Media Access Control) of transmission and reception signals, and PLC•PHY block 213 manages a PHY layer (Physical layer).

The AFE•IC 220 includes a DA converter (DAC: D/A Converter) 221, an AD converter (ADC: A/D Converter) 222, and a variable amplifier (VGA: Variable Gain Amplifier) 223. The coupler 270 includes a coil transformer 271 and coupling capacitors 272a and 272b.

The CPU 211 controls operations of PLC-MAC block 212 and the PLC•PHY block 213 using data stored in the memory 240, and controls the entire PLC modem 100.

The communication by the PLC modem 100 is performed schematically as follows. Data input from the modular jack 103 is transmitted to the main IC 210 through the Ethernet PHY•IC 230, and a digital transmission signal is generated by performing a digital signal process. The generated digital transmission signal is converted into an analog signal by the DA converter (DAC) 221 of the AFE•IC 220, and is output to the power line 700 through the low pass filter 251, the driver IC 252, the coupler 270, the power supply connector 102, the power supply cable 600, the power supply plug 400, and the outlet 500.

The signal received from the power line 700 is transmitted to the band pass filter 260 through the coupler 270, a gain of the signal is adjusted by the variable amplifier (VGA) 223 of the AFE•IC 220, and then the signal is converted into a digital signal by the AD converter (ADC) 222. The converted digital signal is transmitted to the main IC 210 and is converted into digital data by performing a digital signal process. The converted digital data is output from the modular jack 103 through the Ethernet PHY•IC 230.

An example of the digital signal process performed by the main IC 210 will be described. The PLC modem 100 uses multi carrier signals such as OFDM (Orthogonal Frequency Division Multiplexing) signals generated using a plurality of sub-carriers. The PLC modem 100 converts data of a transmission target into multi carrier transmission signals such as OFDM signals, outputs the signals, processes multi carrier reception signals such as OFDM signals, and convert it into reception data. The digital signal process for these conversions is performed mainly in the PLC•PHY block 213.

Figure 4:
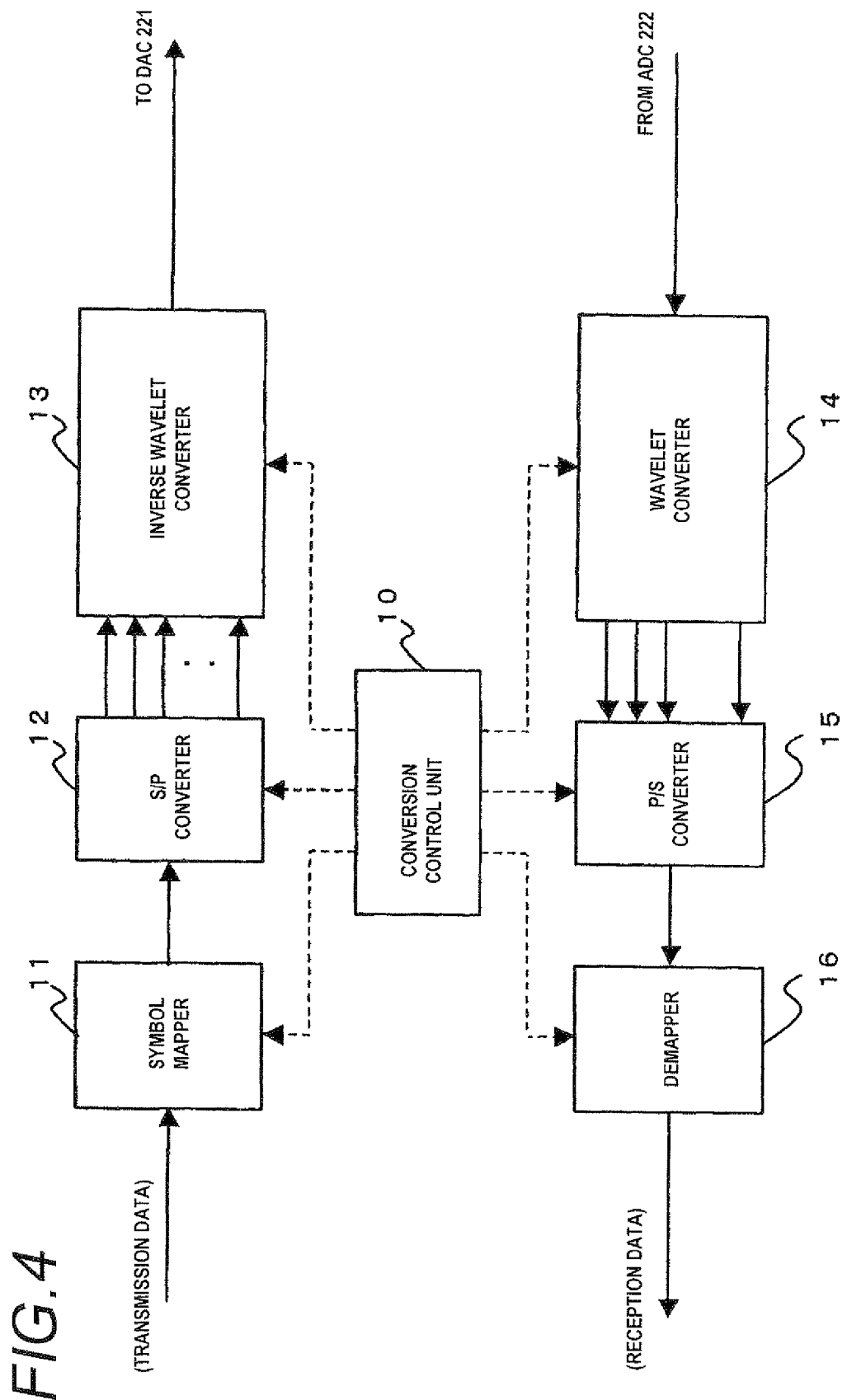
FIG. 4 is a diagram for explaining a digital signal process of the PLC modem according to the embodiment of the invention.

An example of a functional configuration necessary to perform the digital signal process performed by the PLC•PHY block 213 is shown in FIG. 4. The example shown in FIG. 4 shows a configuration of a case of performing OFDM transmission using wavelet conversion. As shown in FIG. 4, the PLC•PHY block 213 has functions of a conversion control unit 10, a symbol mapper 11, a serial-parallel (S/P) converter 12, an inverse wavelet converter 13, a wavelet converter 14, a parallel-serial (P/S) converter 15, and a demapper 16.

The symbol mapper 11 converts bit data to be transmitted into symbol data, and performs symbol mapping (e.g., PAM modulation) according to each symbol data. The serial-parallel converter 12 inputs the mapped serial data, converts the data into parallel data, and outputs the parallel data. The inverse wavelet converter 13 performs inverse wavelet conversion of the parallel data into data on the time axis, and generates a sample value series representing a transmission symbol. This data is transmitted to the DA converter (DAC) 221 of the AFE•IC 220.

The wavelet converter 14 performs discrete wavelet conversion of the reception digital data (sample value series sampled at the same sample rate as that at the time of transmission) obtained from the AD converter (ADC) 222 of the AFE•IC 220 on the frequency axis. The parallel-serial converter 15 rearranges the parallel data input as the data on the frequency axis, converts it into serial data, and outputs the serial data. The demapper 16 calculates an amplitude value of each sub-carrier to obtain reception data by performing determination of a reception signal.

The PLC•PHY block 213, the DAC 221, the LPF 251, and the driver IC 252 shown in FIG. 3 have a function as a transmission unit that transmits various data. The PLC•PHY block 213, the ADC 222, the VGA 223, and the BPF 260 have a function as a reception unit that receives various data. The main IC 210 has a function as a transmission control unit that controls data transmission by the transmission unit.

Figure 5:
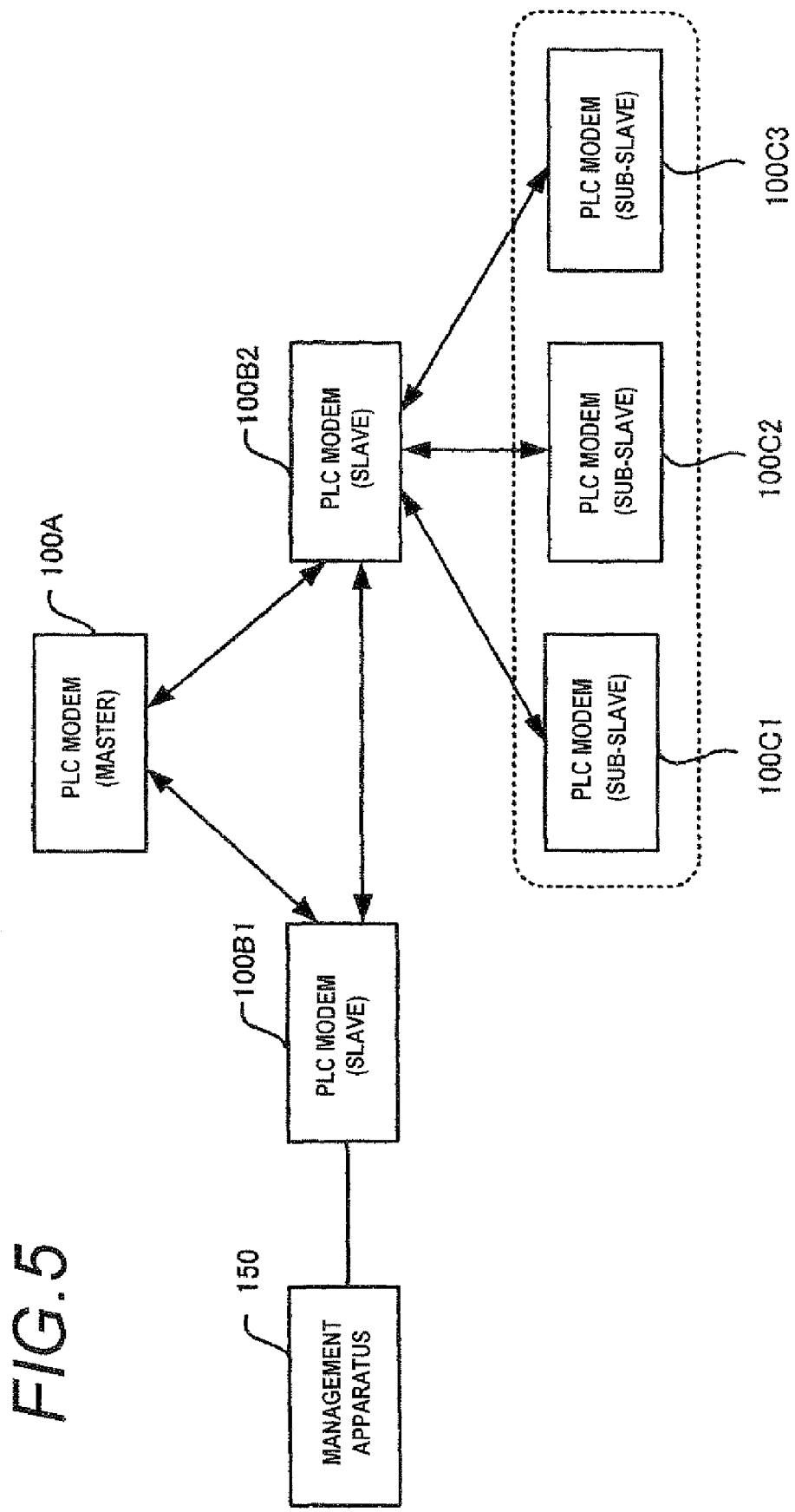
FIG. 5 is a block diagram illustrating an example of a configuration of a power line communication system according to the embodiment of the invention.

Next, FIG. 5 is a configuration block diagram of a power line communication system as an example of a communication system. The power line communication system shown in FIG. 5 is provided with a PLC modem 100A, PLC modems 100B (PLC modems 100B1, 100B2, . . . ), PLC modems 100C (PLC modems 100C1, 100C2, 100C3, . . . ), and a management apparatus 150. The number of actually connected PLC modems may be increased and decreased as necessary. In FIG. 5, the PLC modem 100C is connected only to the PLC modem 100B2, but the PLC modem 100C may be connected to another PLC modem 100B.

Hereinafter, details common for all the PLC modems will be described merely as the PLC modem 100. Details common for the PLC modems 100B1 and 100B2 will be described merely as the PLC modem 100B. Details common for the PLC modems 100C1, 100C2, and 100C3 will be described merely as the PLC modem 100C.

In the communication system shown in FIG. 5, the PLC modems 100 are connected to the common power line 700, and share the common power line 700 as a transmission channel for communication. In addition, the CSMA/CA method is employed as basic communication control, and thus the power line communication system is controlled to reduce frequency when the plurality of PLC modems 100 simultaneously transmits signals. The PLC modems 100 share a communication band.

The PLC modem 100A has a function of operating as a master, and manages the PLC modem 100B connected thereunder and operating as a slave. For example, as a specific operation, the PLC modem 100A transmits a control signal such as a beacon signal to the power line 700. In addition, the PLC modem 100A assigns an access ID for allowing the PLC modem 100B to transmit data to the power line 700. A slot counter for recognizing the present slot ID is kept, for example, by the PLC-MAC 212 shown in FIG. 3 at the time of transmitting data to the power line 700.

The PLC modem 100A stores identification information (e.g., MAC address) of the PLC modem 100B as a management target in a slave management table. The slave management table is stored, for example, in the memory 240 shown in FIG. 3. In the slave management table, an access ID may be registered by associating it with the identification information of the PLC modem 100B. In addition, the other necessary information may be stored. FIG. 6 is an example of the slave management table.

The PLC modem 100B has a function of operating as a slave, and manages the PLC modem 100C connected thereunder and operating as a sub-slave. For example, as a specific operation, the PLC mode 100B detects a control signal such as a beacon signal transmitted to the power line 700 by the PLC modem 100A and synchronizes with it. The PLC modem 100B recognizes an access ID assigned to itself by the PLC modem 100A. In addition, the PLC modem 100B controls data transmission by a process shown in FIG. 9 to be described later. In addition, the same slot counter as the PLC modem 100A is kept, for example, by the PLC-MAC 212.

The PLC modem 100B stores identification information (e.g., MAC address) of the PLC modem 100C as a management target 100 in a sub-slave management table. In addition, other necessary information may be stored. The sub-slave management table is stored, for example, in the memory 240 shown in FIG. 3. FIG. 7 is an example of the sub-slave management table.

The PLC modem 100C (100C1, 100C2, 100C3, . . . ) has a function of operating as a sub-slave. For example, as a specific operation, the PLC modem 100C controls transmission time of itself by a process shown in FIG. 10 or FIG. 12 to be described later. The PLC modem 100C has an inexpensive and a low-performance CPU as the CPU 211, as compared with the PLC modems 100A and 100B. As described above, the CPU 211 of the PLC modem 100C is relatively simple and light, and thus it is possible to reduce a cost of the device.

The management apparatus 150 has a function for managing the entire power line communication system. For example, as a specific operation, the management apparatus 150 periodically collects information about the PLC modem 100C or transmits a command for controlling devices connected to the PLC modem 100C. In addition, the management apparatus 150 performs system management such as change of an encryption key.

Figure 8:
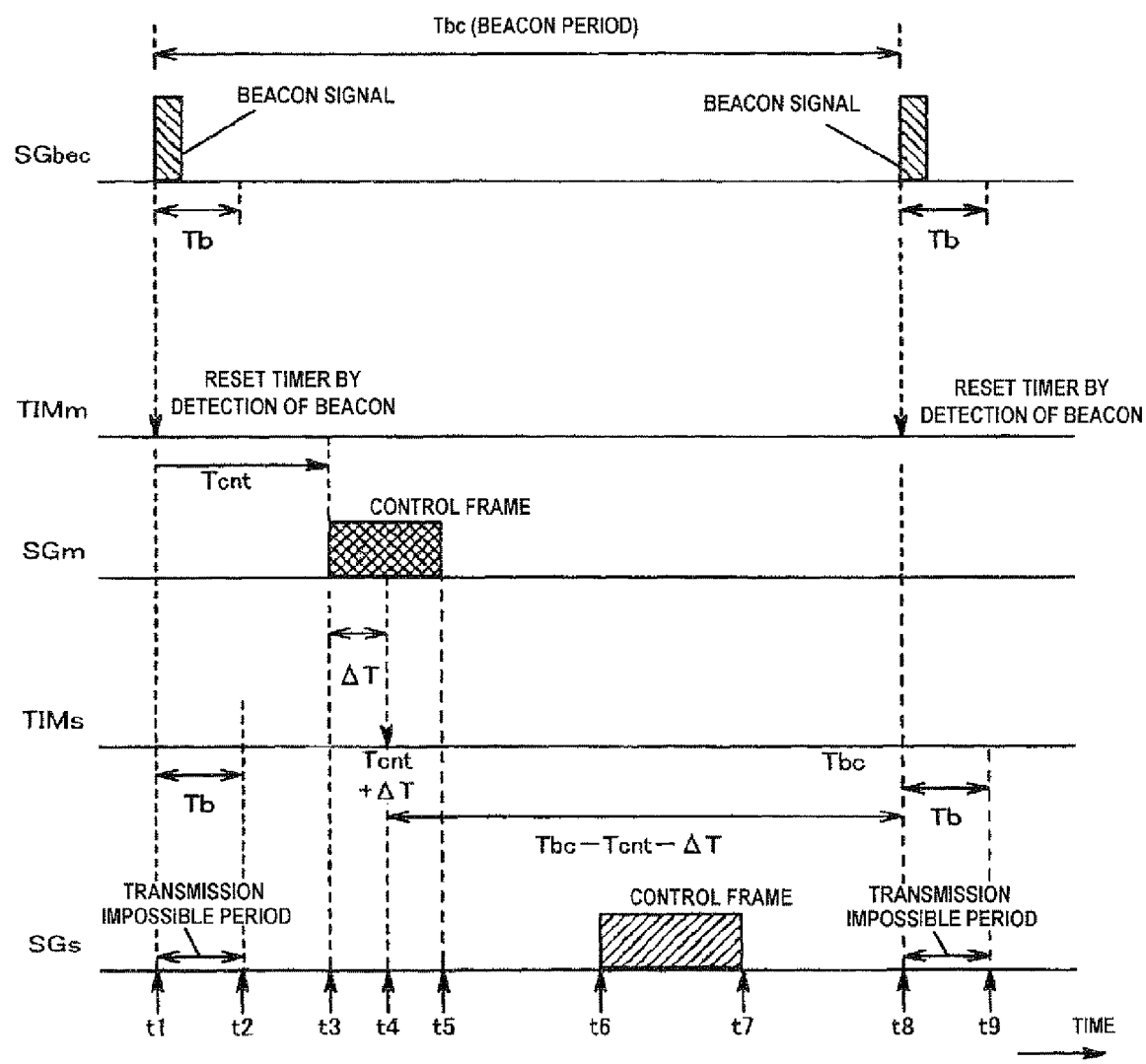
FIG. 8 is a time-series diagram illustrating an example of data transmitted to a power line according to the embodiment of the invention.

Next, the data transmitted to the power line 700 in the power line communication system according to the embodiment will be described. FIG. 8 is a time-series diagram of the data transmitted to the power line 700. In FIG. 8, in case of t1=0 (μs), for example, it is t3=15000 (μs), t6=35000 (μs), and t8=50000 (μs).

FIG. 8 shows a beacon signal SGbec periodically (for every given cycle) transmitted from the PLC modem 100A to the power line 700, a signal SGm transmitted from the PLC modem 100B to the power line 700, a state of a timer TIMm (not shown) provided in the PLC modem 100B, a signal SGs transmitted from the PLC modem 100C to the power line 700, and a state of a timer TIMs (not shown) provided in the PLC modem 100C.

The beacon signal SGbec includes information such as slot assignment information (i.e., access ID). For this reason, the time when the beacon signal SGbec can be transmitted, that is, a period of a duration Tb of the beacon signal represented at every beacon period Tbc becomes a transmission impossible period prohibiting the other PLC modem 100 from transmitting data. That is, the transmission impossible period is a period estimated as that the beacon signal is on the transmission channel. The PLC modem 100 operates to perform data transmission to the power line 700 at a period except for the transmission impossible period (synchronous signal non-existing period).

The timers TIMm and TIMs count a clock pulse with a regular period (e.g., 1 μsec) generated in the PLC modem to count a time elapsed from any time point. The signal SGm transmitted from the PLC modem 100B to the power line 700 is transmitted while avoiding the time of the beacon signal transmitted from the PLC modem 100A to the power line 700. That is, the PLC modem 100B detects the beacon signal and determines the time, thereby performing the data transmission at a period except for the transmission impossible period.

Next, an operation of the PLC modem 100B at the time of transmitting data will be described.

Figure 9:
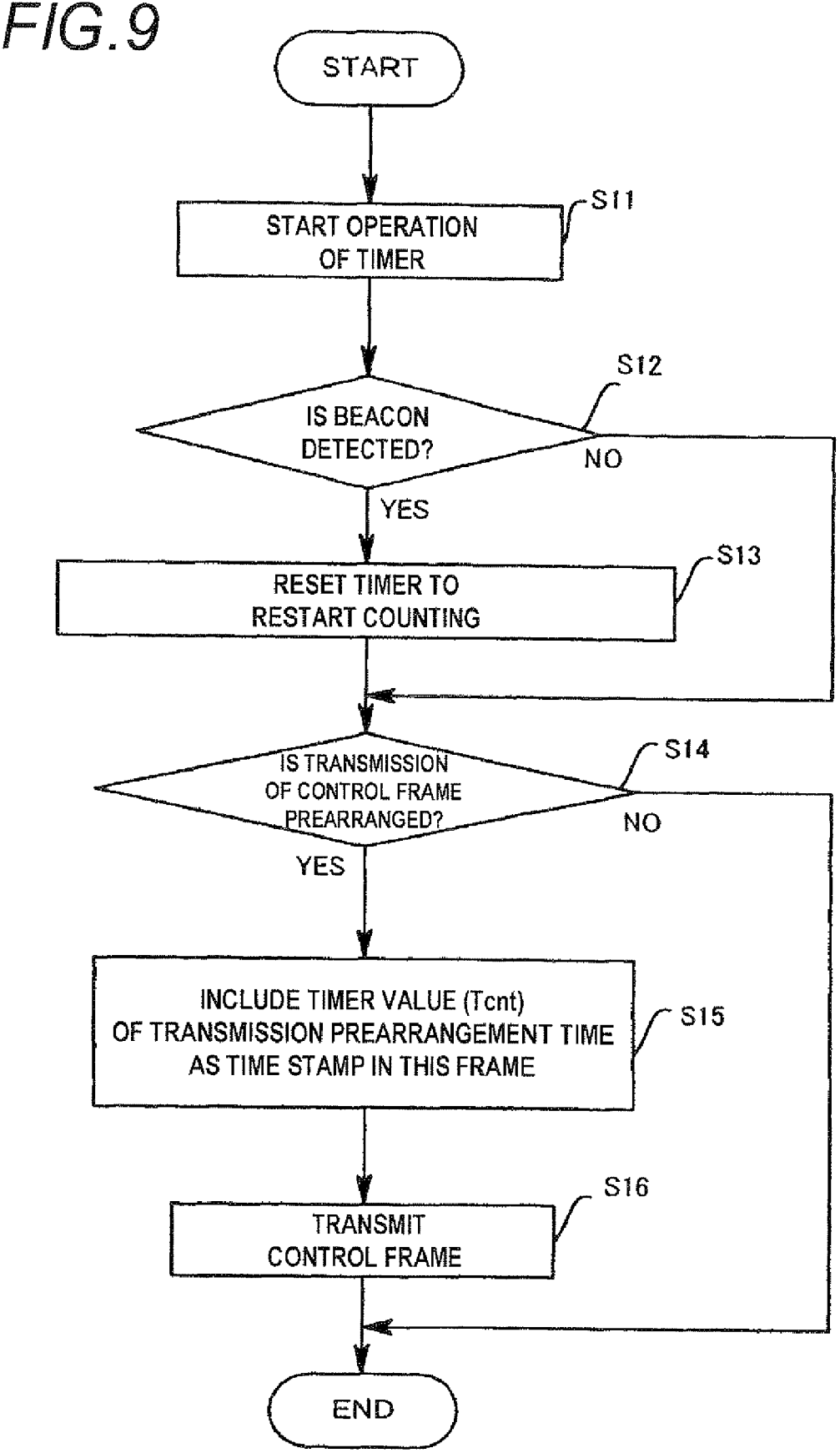
FIG. 9 is a flowchart illustrating an example of an operation at the time of data transmission of the PLC modem (slave) according to the embodiment of the invention.

FIG. 9 is a flowchart illustrating an example of the operation of the PLC modem 100B at the time of transmitting data. Control at the time of transmitting data is performed by the main IC 210.

In Step S11, the PLC modem 100B starts an operation of the timer TIMm.

The timer TIMm counts a time elapsed from this time point, for example, by a 1 μsec unit.

In Step S12, the PLC modem 100B determines whether or not a beacon signal transmitted from the PLC modem 100A is detected. In the example shown in FIG. 8, a beacon signal is transmitted from the PLC modem 100A at a regular beacon period Tbc (e.g., 50 msec), and the beacon signal is present on the power line 700 at the time t1 to t2 and the time t8 to t9. The duration Tb of the beacon signal is given.

When the beacon signal is detected, the PLC modem 100B resets the timer TIMm and restarts counting in Step S13. In the example shown in FIG. 8, the PLC modem 100B detects the beacon signal at the time t1, and resets the timer TIMm at this time. Accordingly, the value counted by the timer TIMm indicates time elapsed from the time t1. Similarly, the PLC modem 100B detects the beacon signal at the time t8, and resets the timer TIMm at this time. Accordingly, the value counted by the timer TIMm thereafter indicates a time elapsed from the time t8.

In Step S14, the PLC modem 100B confirms whether or not transmission of a control frame is prearranged. When the transmission is prearranged, the process proceeds to next Step S15.

When the transmission of the control frame is prearranged, the PLC modem 100B allows the control frame to include information representing a timer value of a transmission prearrangement time as a time stamp in Step S15. In the example shown in FIG. 8, the control frame of starting transmission at the time t3 includes a count value Tcnt (time elapsed from time t1 represented by t3-t1) of the timer TIMm at the time t3.

In Step S16, the PLC modem 100B transmits the control frame including the count value Tcnt of the timer TIMm to the power line 700. When there is a time difference (ΔT1) until Step S16 is performed after Step S15 is performed, it is preferable that a result obtained by adding the time difference (ΔT1) to the count value Tcnt is included in the control frame. Accordingly, it is possible to prevent errors from occurring.

Next, an operation of the PLC modem 100C at the time of transmitting data will be described.

Figure 10:
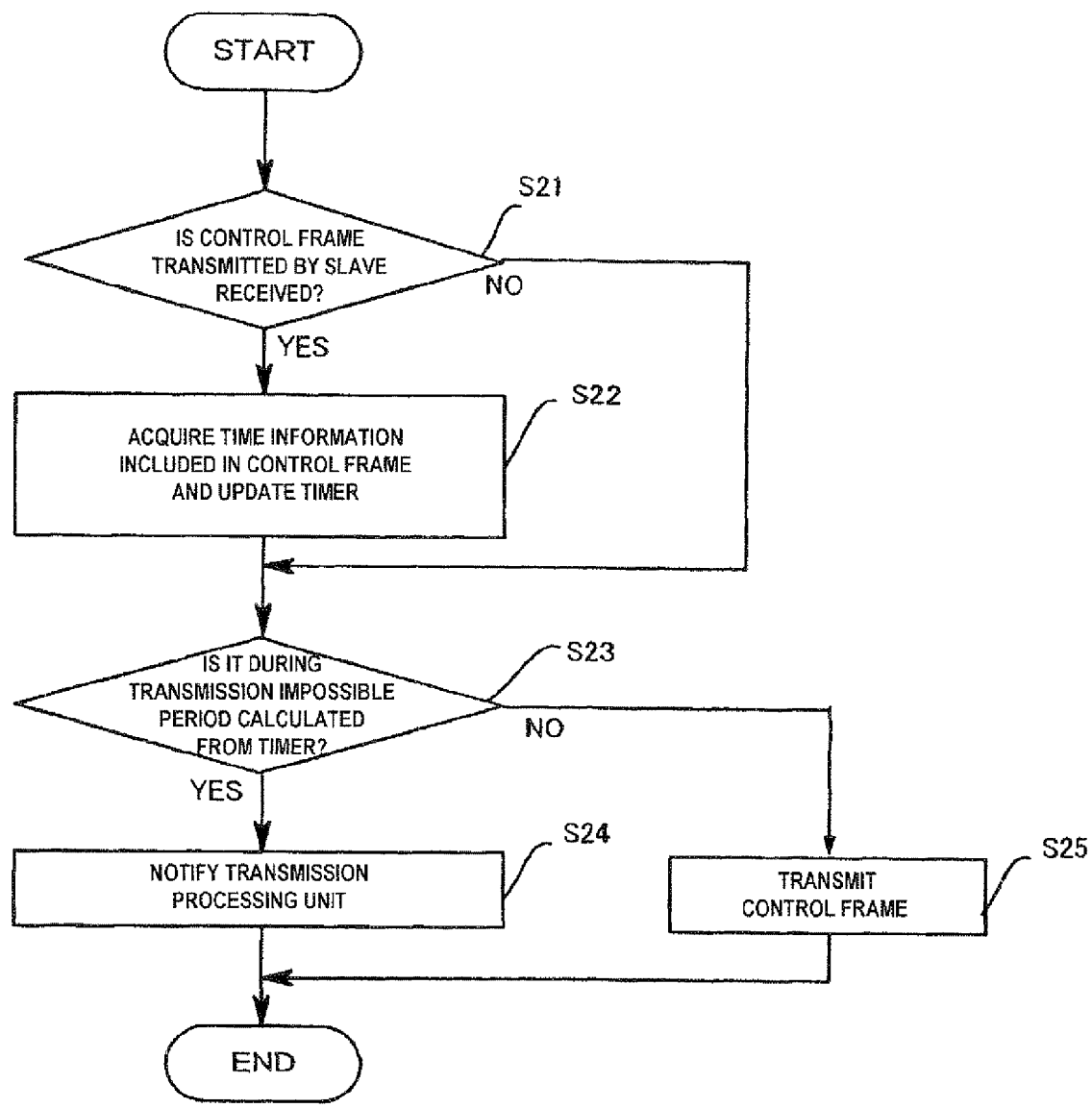
FIG. 10 is a flowchart illustrating an example of an operation at the time of data transmission of the PLC modem (sub-slave) according to the embodiment of the invention.

FIG. 10 is a flowchart illustrating an example of the operation of the PLC modem 100C at the time of transmitting data. Control at the time of transmitting data is performed by the main IC 210.

In Step S21, the PLC modem 100C determines whether or not the control frame transmitted from the PLC modem 100B managing the PLC modem 100C is received through the power line 700.

When the control frame is received from the PLC modem 100B, in Step S22, the PLC modem 100C acquires the time stamp as time information included in the control frame received in Step S21 and updates the timer TIMs. Similarly to the PLC modem 100B, in the PLC modem 100C, the timer TIMs counts a time elapsed from any time point, for example, by a 1 μsec unit. For example, as shown in FIG. 8, when the PLC modem 100C detects the control frame of the PLC modem 100B present on the power line 700 as the signal SGm at the time t4, the value of the time stamp included therein is preset to the timer TIMs to continue the operation of the timer TIMs. In addition, when there is a time difference (ΔT) between a time (time t3 of starting reception of control frame in this example) corresponding to the value of the time stamp and a time of presetting the value to the timer TIMs, it is preferable to preset a result obtained by adding the time difference (ΔT) to the value of the time stamp. Accordingly, it is possible to prevent errors from occurring.

Accordingly, in the example shown in FIG. 8, the PLC modem 100C presets "Tcnt+ΔT" to the timer TIMs in consideration of the time difference at the time t3, the count value of the timer TIMs after the time t4 substantially coincides (synchronizes) with the elapsed time managed by the timer TIMm of the PLC modem 100B. For this reason, the PLC modem 100C estimates a transmission impossible period represented by the beacon signal at the next time by the count value of the timer TIMs on the basis of the beacon period Tbc and the duration Tb of the beacon signal. That is, it is possible to estimate that the beacon signal is present at the period from the time (corresponding to t8) coinciding with the beacon period Tbc to the time (corresponding to t9) additionally elapsed by the regular duration Tb by the count value of the timer TIMs.

The PLC modem 100C may previously store the beacon period Tbc and the duration Tb of the beacon signal transmitted by the PLC modem 100A in the memory 240 or the like. Alternatively, the beacon period Tbc and the duration Tb the PLC modem 100B transmitted to the PLC modem 100B is included in the control frame, and may be transmitted to the PLC modem 100C through the power line 700. The PLC modem 100B can acquire Tbc and Tb by receiving the beacon signal.

Subsequently, in Step S23, the PLC modem 100C determines whether or not the present time is within the transmission impossible period by comparing the count value of the timer TIMs with Tbc and Tbc+Tb. When the present time is within in the transmission impossible period, the process proceeds to next Step S24.

When the present time is within the transmission impossible period, in Step S24, the PLC modem 100C (main IC 240 thereof) notifies the transmission processing unit (included in PLC•MAC block 212) of itself that the present time is within the transmission impossible period, and waits for transmission of the control frame until the transmission impossible period is ended.

When the present time is not within the transmission impossible period, the PLC modem 100C estimates that the beacon signal is not present on the power line 700, and transmits the control frame at this period (Step S25). Accordingly, it is possible securely avoid collision between the control frame or the like transmitted by the PLC modem 100C and the beacon signal transmitted by the PLC modem 100A.

Although not shown in FIG. 10, the PLC modem 100C may allow the control frame (e.g., header of control frame) transmitted as the signal SGs to the power line 700 to include the count value of the timer TIMs corresponding to the transmission time of the control frame as the time stamp. For example, the control frame transmitted at the time t6 shown in FIG. 8 by the PLC modem 100C includes the count value of the timer TIMs corresponding to the time t6. However, the PLC modem 100B may ignore the content of the time stamp as the time information of the control frame transmitted by the PLC modem 100C1. When the control frame transmitted by the PLC modem 100C is received by the other PLC modem 100C, it is possible to recognize the time of the beacon signal according to the time information.

According to such a power line communication system provided with the PLC modems performing the processes shown in FIG. 8 to FIG. 10, even in case of the PLC modem 100C having no function of detecting the beacon signal, it is possible to prevent the signal transmitted by itself and the beacon signal periodically transmitted by the PLC modem 100A from colliding with each other on the power line 700. Accordingly, it is possible to inexpensively build the power line communication system capable of avoiding signal collision with the signals transmitted by the other PLC modems 100 on the power line 700 by adding the above-described PLC modem 100C to the power line communication system configured by the PLC modems 100A and 100B. Particularly, there is a limit in the number of PLC modems 100B which can be registered for the PLC modem 100A to manage the PLC modems 100B, and thus it is effective in the case of building a large scale power line communication system.

In FIG. 8, the signal SGm transmitted by the PLC modem 100B is the control frame, but may be a general data frame including the time information and the like.

In FIG. 8, the beacon period Tbc and the duration Tb are considered to know the transmission time of the beacon signal, but the duration Tb may not be considered.

Next, a power line communication system having a plurality of power line communication networks will be described.

Figure 11:
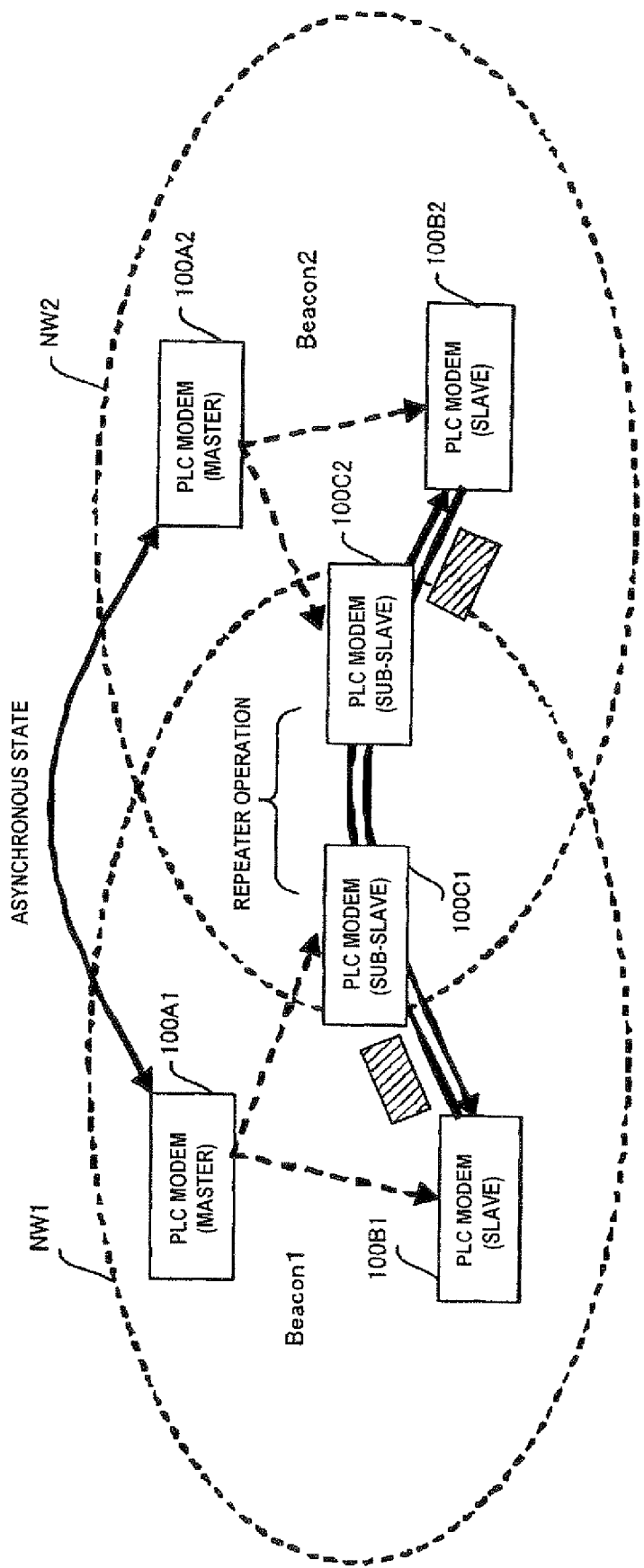
FIG. 11 is a block diagram illustrating an example of a configuration of a power line communication system having a plurality of power line communication networks according to the embodiment of the invention.

Considering the power line communication system shown in FIG. 5 as one power line communication network, the power line communication system shown in FIG. 11 is a system having a plurality of such networks. In the example shown in FIG. 11, a first network NW1 and a second network NW2 are provided. The first network NW1 is provided with a PLC modem 100A1 operating as a master, a PLC modem 100B1 operating as a slave, and a PLC modem 100C1 operating as a sub-slave. The second network NW2 is provided with a PLC modem 100A2 operating as a master, a PLC modem 100B2 operating as a slave, and a PLC modem 100C2 operating as a sub-slave.

The PLC modem 100 of the first network NW1 and the PLC modem 100 of the second network NW2 are connected to a power line 700 as a common transmission channel. As shown in FIG. 11, the PLC modems 100C1 and 100C2 as the sub-slaves located at a short distance from each other operate as a relay station such as a repeater and a bridge between both networks by given settings (setting of repeater mode, etc.), and can connect the networks to each other. In FIG. 11, the number of networks is 2, but is not limited thereto.

In the power line communication system shown in FIG. 11, a beacon signal (Beacon 1 in FIG. 11) transmitted by the PLC modem 100A1 of the first network NW1 is different from a beacon signal (Beacon 2 in FIG. 11) transmitted by the PLC modem 100A2 of the second network NW2. There may be a case where one PLC modem 100A cannot recognize the beacon signal transmitted by the PLC modem 100A of the other network. In this case, the first network NW1 and the second network NW2 are in an asynchronous state.

Next, an operation of the PLC modems 100B and 100C in the power line communication system having the plurality of power line communication networks will be described.

The operation of the PLC modem 100B is the same as the operation of the PLC modem 100B shown in FIG. 9.

Figure 12:
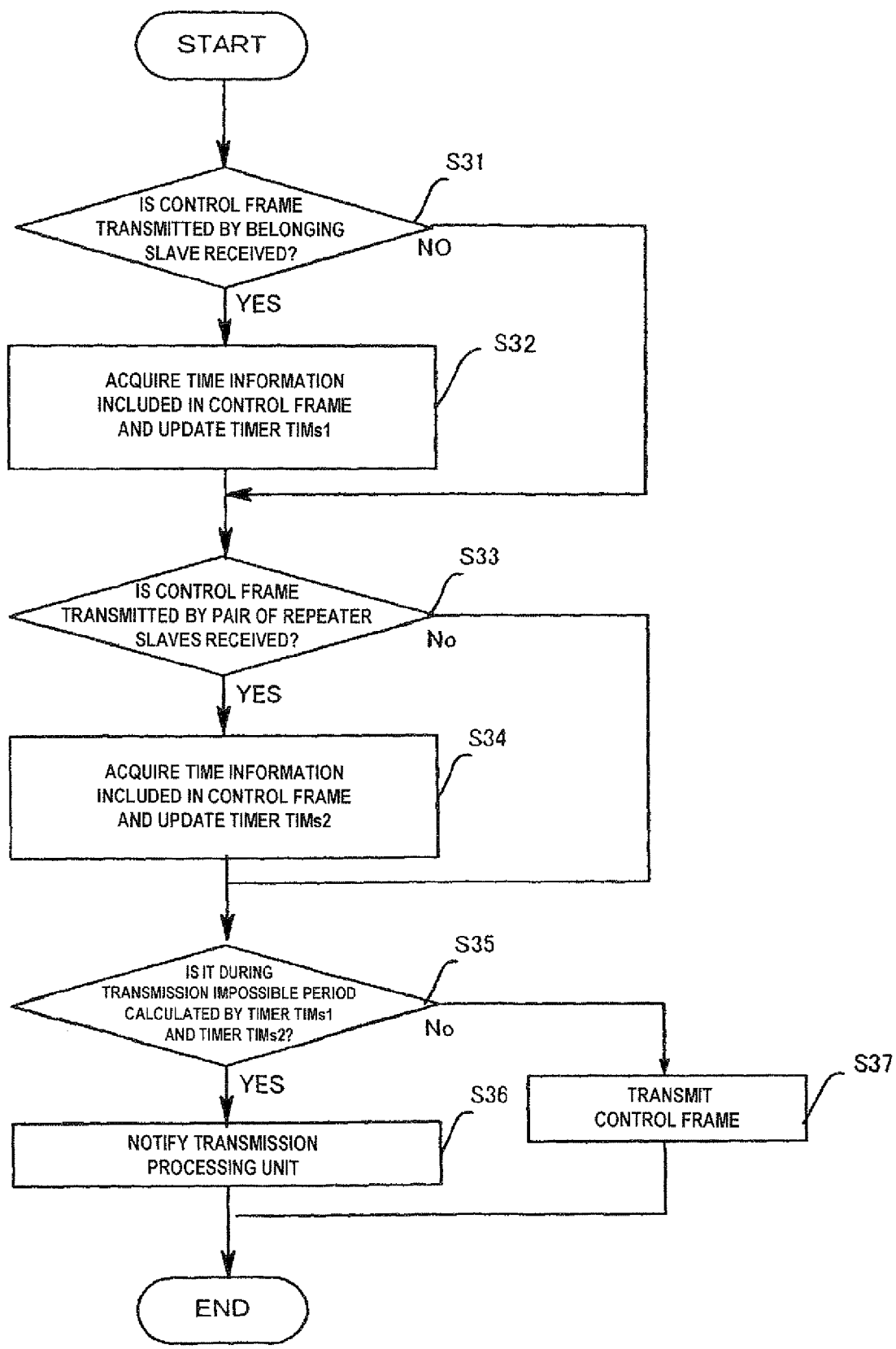
FIG. 12 is a flowchart illustrating an example of an operation at the time of data transmission of the PLC modem (sub-slave) according to the embodiment of the invention.

FIG. 12 is a flowchart illustrating an example of an operation of the PLC modem 100C operating as a repeater at the time of transmitting data. Control at the time of transmitting data is performed by the main IC 210. The PLC modems 100C use an internal timer TIMs1 (not shown) of itself and an internal time TIMs2 of the PLC modem 100C2. Herein, the operation of the PLC modem 100C1 included in the first network NW1 in the power line communication system shown in FIG. 11 is described, but the operation of the PLC modem 100C2 of the second network NW2 is the same. The operation of the other PLC modems (not shown in FIG. 11) operating as repeaters is the same.

When the PLC modem 100C1 transmits the control frame (corresponding to SGs shown in FIG. 8), the control frame includes, as a time stamp, time information of the internal timer TIMs1 as time information in the network including itself. However, the PLC modem 100B1 may ignore the content of the time stamp as the time information of the control frame transmitted from the PLC modem 100C1. When the control frame transmitted by the PLC modem 100C1 is received by the other PLC modem 100C2, it is possible to recognize a time of the beacon signal used in the first network NW1 according to the time information.

In Step S31, the PLC modem 100C1 determines whether or not the control frame transmitted from the PLC modem 100B1 managing the PLC modem 100C1 is received.

When the control frame is received from the PLC modem 100B1, in Step S32, the PLC modem 100C1 acquires the time information included in the control frames received in Step S31, and updates the internal timer TIMs1. Similarly to the case of the PLC modem 100B, the timer TIMs1 of the PLC modem 100C1 counts a time elapsed from any time point, for example, by a 1 μsec unit. The method of updating the internal timer TIMs1 is the same as Step S22 shown in FIG. 10.

In Step S33, the PLC modem 100C1 determines whether or not the control frame transmitted from the PLC modem 100C2 operating as a repeater of a network (herein, second network NW2) that is a partner as a destination of communication of itself is received. In addition, the PLC modem 100C1 can identify whether or not the PLC modem 100 transmitting the received control frame is the PLC modem 100C2 operating as a repeater that is the destination of communication, by registering specific information such as a MAC address in the PLC modem 100C1 and comparing a transmission destination address with the specific information.

When the control frame is received from the PLC modem 100C2, in Step S34, the PLC modem 100C1 acquires the time information included in the control frame received in Step S33, and updates the internal timer TIMs2. The timer TIMs2 counts a time elapsed from any time point, for example, by a 1 μsec unit. The method of updating the internal timer TIMs2 is the same as Step S22 shown in FIG. 10. In this case, the PLC modem 100C1 previously stores a period Tbc2 of the beacon signal and a duration Tb2 used by the second network or notifies them.

The information of the time stamp as the time information included in the control frame transmitted from the PLC modem 100C2 that is the destination of communication is information of the elapsed time counted by synchronizing with the beacon signal used in the second network NW2 including the PLC modem 100C2, and represents a transmission time of the control frame. Accordingly, the count value of the timer TIMs2 of the PLC modem 100C1 synchronizes with the time of the beacon signal of the second network NW2 at the time point of performing Step S34.

For this reason, in the PLC modem 100C1, it is possible to estimate the transmission impossible period in which the beacon signal is present on the power line 700 at the next time in the first network NW1 by the count value of the timer TIMs1, and it is possible to estimate the transmission impossible period in which the beacon signal is present at the next time in the second network NW2 by the count value of the timer TIMs2. That is, it is possible to estimate that the beacon signal is present at a period from the time when the count values of the timers TIMs1 and TIMs2 coincide with the beacon periods Tbc, respectively, to the time when the regular duration Tb is additionally elapsed.

Subsequently, in Step S35, the PLC modem 100C1 determines whether or not a time point of comparison is within the transmission impossible period by comparing the count value of the timer TIMs1 with Tbc1 (beacon period of first network NW1) and Tbc1+Tb1 (duration of beacon signal of first network NW1), and comparing the count value of the timer TIMs2 with Tbc2 (beacon period of second network NW2) and Tbc2+Tb2 (duration of beacon signal of second network NW2).

That is, in case corresponding to at least any one of a period of expecting that the beacon signal (Beacon 1) used in the first network NW1 is present on the power line 700 and a period of expecting that the beacon signal (Beacon 2) used in the second network NW2 is present on the power line 700, Step S36 is performed.

In case of the transmission impossible period, in Step S36, the PLC modem 100C1 (main IC 240 thereof) notifies the transmission processing unit (included in PLC•MAC block 212) of itself that the time is within the transmission impossible period, and waits for transmission of the control frame until the transmission impossible period is ended.

Meanwhile, when the time is not within the transmission impossible period, the PLC modem 100C estimates that it is a period in which the beacon signal is not present on the power line 700, and transmits the control frame at this period (Step S37). Accordingly, it is possible securely avoid collision between the control frame or the like transmitted by the PLC modem 100C1 and the beacon signal of each network in which the PLC modem 100C1 is not included.

When the operation shown in FIG. 12 is performed and the power line communication system having the plurality of power line networks is configured, the PLC modem 100C1 recognizes the time of the beacon signal of a destination of relay (destination of communication) as well as the network including each PLC modem 100C operating as a repeater. This is possible by estimating times since the time of the beacon signal (Beacon 1) is managed by the timer TIMs1 and the time of the beacon signal (Beacon 2) is managed by the timer TIMs2.

In the specific example shown in FIG. 13, it is possible to estimate that the beacon signal (Beacon 1 or Beacon 2) presents at the period of the time t1 to t2, the period of the time t5 to t6, the period of the time t9 to t10, and the period of the time t13 to t14, and thus the PLC modem 100C1 avoids these periods and performs communication at the period of the time t3 to t4, the period of the time t7 to t8, and the period of the time t11 to t12.

As described above, even when the beacon signal transmitted from the PLC modem 100A of one network NW cannot be recognized by the PLC modem 100 of the other network NW, it is possible to prevent the signal transmitted by the PLC modem 100C of one network and the beacons signal transmitted by the PLC modem 100A of the other network from colliding with each other on the common power line 700.

In FIG. 12, the case where the number of power line networks is 2 (PLC modem 100C1 and one PLC modem 100C2 as destination of communication) has been assumed by considering the communication system shown in FIG. 11. However, even when the number of power line network is 2 or more, the PLC modems 100C use the internal timers as many as the number of networks and thus it is possible to perform the process shown in FIG. 12.

Next, an operation when the PLC modem 100C operating as a repeater relays communication between the power line communication networks will be described. Herein, the PLC modem 100C1 is described by way of example, but an operation of the PLC modem 100C2 and the other PLC modem 100C operating as a repeater (Not shown in FIG. 11) is the same.

When the PLC modem 100C1 operates as a repeater and the PLC modem 100C1 receives the control frame from the PLC modem 100B of the first network NW1 including the PLC modem 100C1 to the other network (e.g., second network NW2), the PLC modem 100C1 relays the control frame and transmits it to the PLC modem (e.g., PLC modem 100C2) operating as a repeater of the other network at the time except for the transmission impossible period. The PLC modem 100C2 transmits the received control frame to the PLC modem 100B2 managing the PLC modem 100C2.

When the PLC modem 100C1 receives the control frame transmitted from the PLC modem 100C2 operating as a repeater in the other network (e.g., second network NW2), the PLC modem 100C1 relays the control frame and transmits it to the PLC modem 100B1 of the first network NW1 including the PLC modem 100C1. When the PLC modem 100C1 relays the received control frame, the PLC modem 100C1 updates the value of the time stamp in the received control frame, using the value of the timer TIMs1 or TIMs2 of the PLC modem 100C1.

As described above, even when the PLC modem 100C1 operating as a repeater relays the communication between the power line communication networks and the beacon signal transmitted from the PLC modem 100A of one network NW cannot be recognized by the PLC modem 100 of the other network NW, it is possible to perform communication without signal collision while synchronizing among the plurality of power line communication networks. Accordingly, in case of configuring a control system such as factory automation, it is expected that the system becomes a large-scale system and becomes a power line communication system including various power line communication networks. However, the PLC modem 100C relays a simple control signal among a plurality of networks and thus it is possible to perform a remote control or the like.

In the embodiment, the PLC modems 100 (PLC modems 100A to 100C) has been described, but the invention may be applied to electric devices (e.g., television, microwave oven, air conditioner, refrigerator, etc.) provided with the PLC modems 100 therein.

In the embodiment, the power line communication system using the power line as the transmission channel has been described as a communication system, but the invention may be applied to, for example, a wireless system configured by a communication apparatus such as a wireless LAN.

The invention is useful for a communication method, a communication apparatus, and a communication system capable of inexpensively avoiding signal collision with signals transmitted by the other communication apparatuses.

This application is based upon and claims the benefit of priority of Japanese Patent Application No. 2008-324613 filed on Dec. 19, 2008, the contents of which are incorporated herein by reference in its entirety.

What is claimed is:

1. A communication apparatus for sharing a transmission channel with a first communication device that transmits a first synchronous signal for synchronizing a plurality of communication devices including at least a second communication device, said communication apparatus comprising:
 a receiving unit that receives, from the second communication device, information based on a transmission time of the first synchronous signal in the event that the first communication device transmits the first synchronous signal to the second communication device;
 a transmission control unit that estimates, on the basis of both the information and a cycle of the first synchronous signal, a period in which there is no synchronous signal on the transmission channel; and
 a transmission unit that transmits data to the transmission channel within the period, wherein:
 the receiving unit receives, through the transmission channel, the information based on the transmission time at a first given cycle, the communication apparatus and the first communication device being included in a first power line network, and receives second data including second time information based on a second transmission time when a second synchronous signal is transmitted to the transmission channel from the second communication device at a second given cycle, the second communication device and another communication device except for the communication apparatus being included in a second power line network, and
 the transmission control unit estimates the period on the basis of the first time information, the second time information, the first given cycle, and the second given cycle, which are received by the receiving unit, and controls the transmitting unit to transmit data within the estimated period.

2. The communication apparatus according to claim 1, wherein the transmission control unit estimates the period on the basis of a duration when the first synchronous signal is transmitted, and controls the transmitting unit to transmit data within the estimated period.

3. The communication apparatus according to claim 1, wherein the transmission control unit estimates the period on the basis of a first duration when the first synchronous signal is transmitted and a second duration when the second synchronous signal is transmitted and controls the transmitting unit to transmit data within the estimated period.

4. The communication apparatus according to claim 1, further comprising a storage unit that previously stores information of the given cycle and information of the duration.

5. The communication apparatus according to claim 1, wherein the receiving unit receives data including information of the given cycle and information of the duration in addition to the time information.

6. The communication apparatus according to claim 1, wherein the transmission control unit inserts information of transmission time of data to be transmitted by the transmitting unit into the data to be transmitted, on the basis of the first time information received by the receiving unit.

7. The communication apparatus according to claim 1, wherein power line is used as the transmission channel to perform power line communication.

8. The communication apparatus according to claim 1, further comprising a timer for counting a time elapsed from a time point, wherein the timer is updated in accordance with the received time information.

9. The communication apparatus according to claim 1, wherein the time information indicates a time elapsed from a reception time of the first synchronous signal to a transmission time of the data.

* * * * *